June 7, 1966  A. EISELE  3,254,416
MULTIPLE CONCENTRICITY AND PERPENDICULARITY GAUGE
Filed Sept. 3, 1963  3 Sheets-Sheet 1
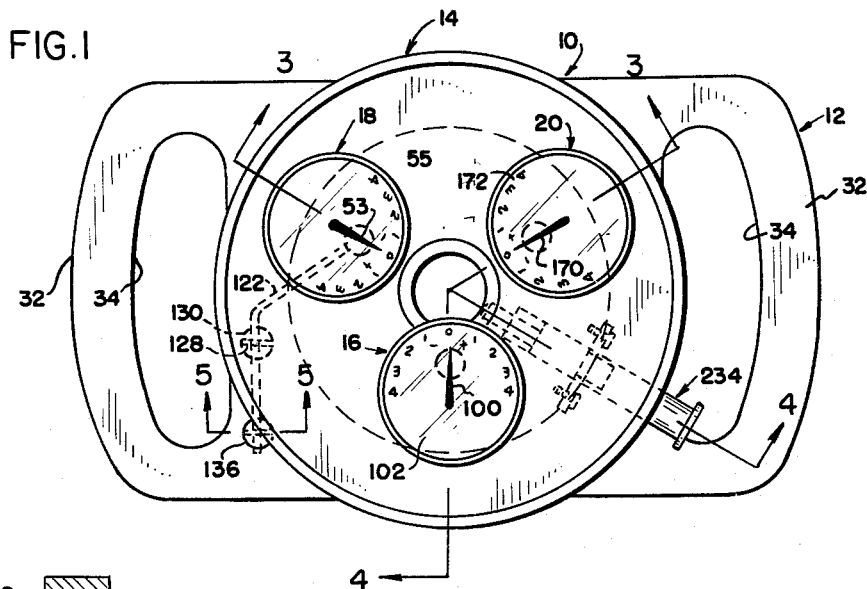
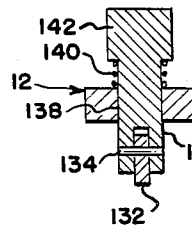
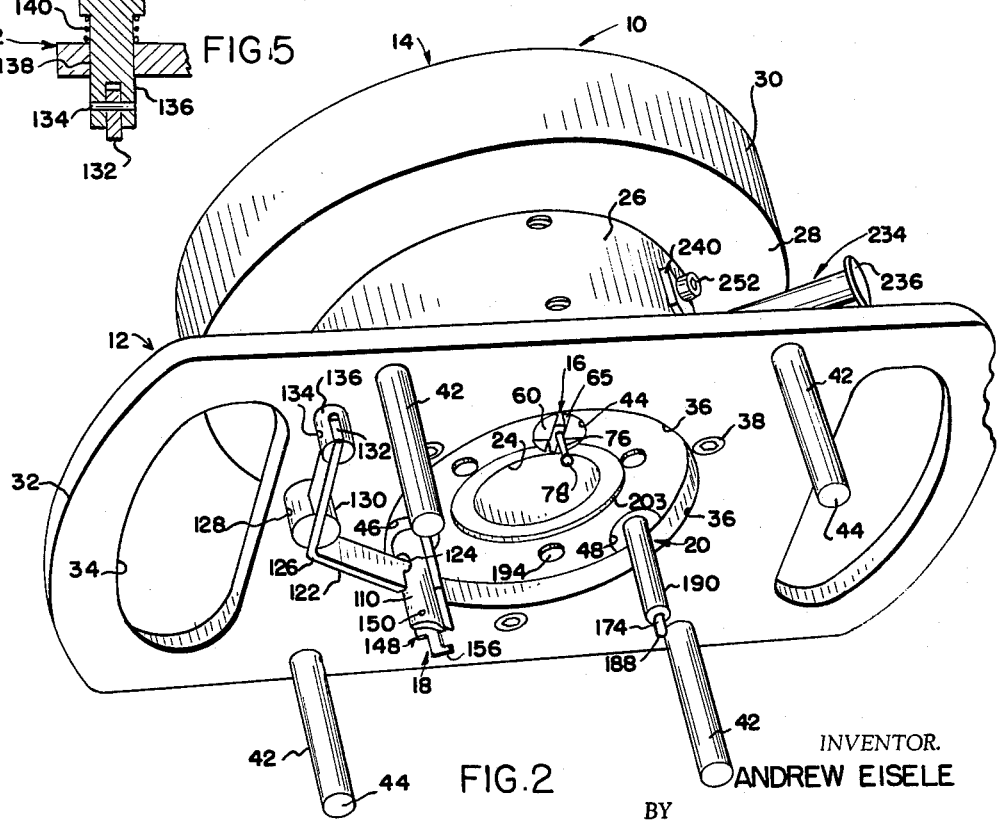
INVENTOR.
ANDREW EISELE
BY
Barthel & Bugbee
ATTORNEYS

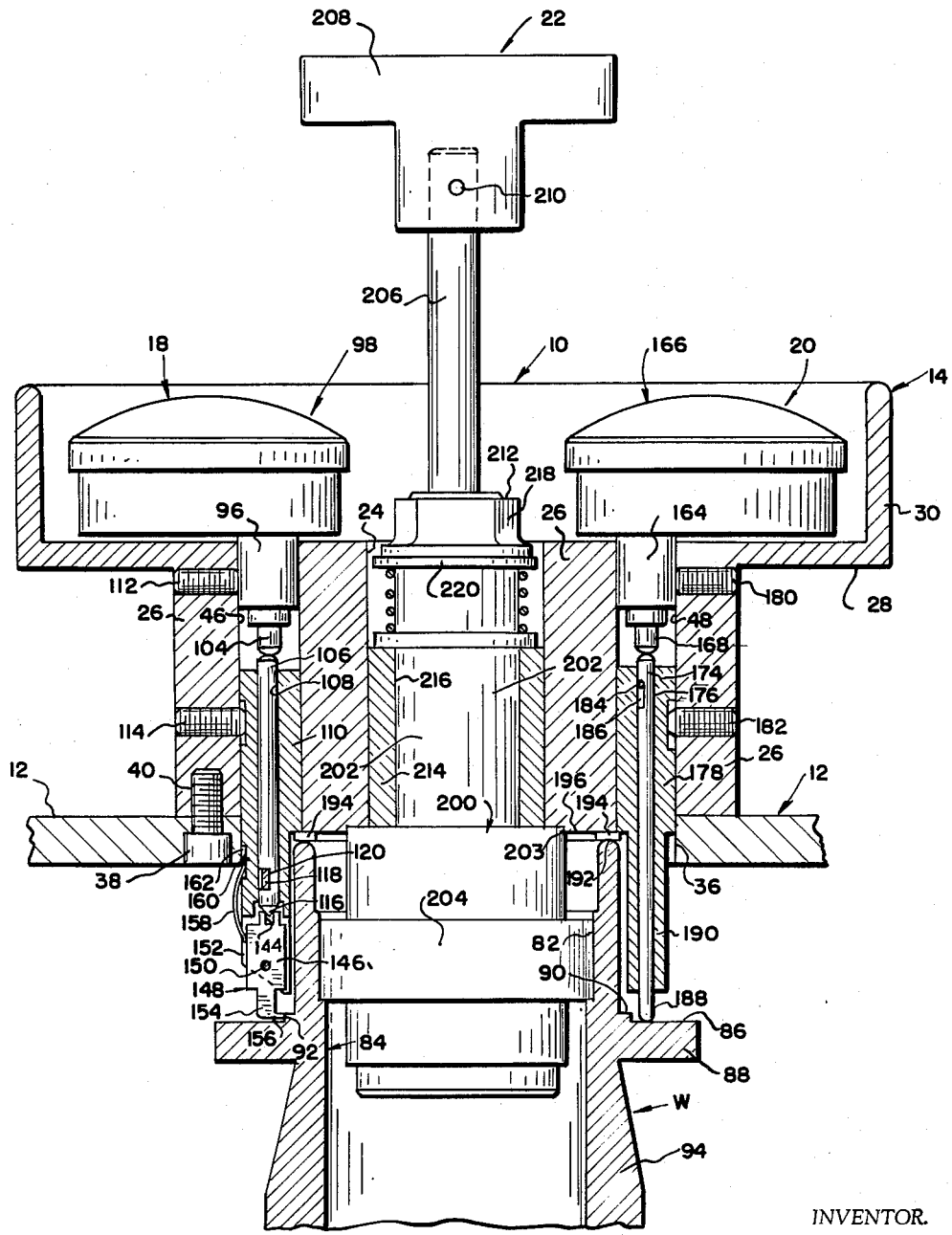

United States Patent Office 3,254,416
Patented June 7, 1966

3,254,416
MULTIPLE CONCENTRICITY AND PERPENDICULARITY GAUGE
Andrew Eisele, 15025 Cheyenne Ave., Detroit, Mich. 48227
Filed Sept. 3, 1963, Ser. No. 305,927
14 Claims. (Cl. 33—174)

This invention relates to precision gauges and, in particular, to concentricity gauges.

One object of this invention is to provide a multiple concentricity and perpendicularity gauge whereby an inspector can simultaneously measure the concentricity of two surfaces of circular cross-section relatively to a reference bore and at the same time measure the perpendicularity of a third surface relatively to the axis of the reference bore.

Another object is to provide a multiple concentricity and perpendicularity gauge of the foregoing character wherein the outer surface concentricity measuring device has means for retracting the feeler or measuring member during application of the gauge to the work, so as to avoid damage thereto.

Another object is to provide a multiple concentricity and perpendicularity gauge of the foregoing character wherein the measurements of concentricity and perpendicularity and any departures therefrom are indicated simultaneously upon the dials of dial indicators which are simultaneously in view of the inspector.

Another object is to provide a multiple concentricity and perpendicularity gauge of the foregoing character wherein the gauge is provided with a pilot device which is inserted in the reference bore in snugly fitting relationship therewith and serves to center the instrument in that bore.

Another object is to provide a multiple concentricity and perpendicularity gauge of the foregoing character wherein the instrument is mounted in a single assembly upon a holder which is easily grasped and held in the hands of the inspector and quickly and easily manipulated thereby.

Other objects and advantages of the invention will become apparent during the course of the following description of the accompanying drawings, wherein:

FIGURE 1 is a top plan view of a multiple bore concentricity and surface perpendicularity gauge, removed from the work, according to one form of the invention;

FIGURE 2 is a bottom perspective view of the gauge shown in FIGURE 1, removed from the work;

FIGURE 3 is a central vertical section in two planes at obtuse angles to one another taken along the bent line 3—3 in FIGURE 1, applied to the work;

FIGURE 5 is an enlarged fragmentary vertical section taken along the line 5—5 in FIGURE 1, showing the feeler-retracting push button.

Figure 4:
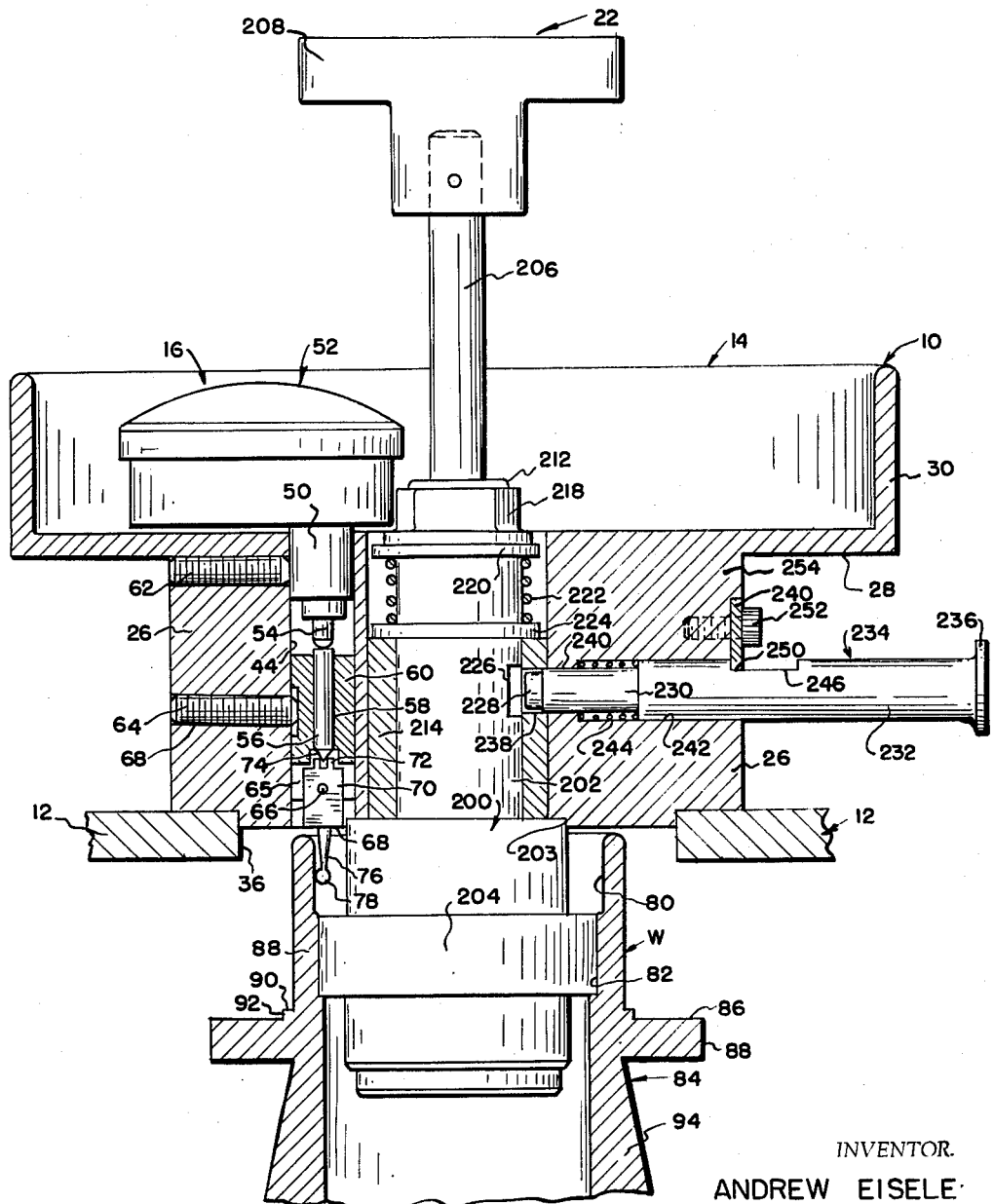
FIGURE 4 is a central vertical section in two planes at acute angles to one another taken along the bent line 4—4 in FIGURE 4, also applied to the work.

Referring to the drawings in detail, FIGURES 1 and 2 show a multiple concentricity and perpendicularity gauge, generally designated 10, according to one form of the invention as consisting generally of a holder 12 carrying a housing 14 in which are mounted an internal concentricity-measuring device, generally designated 16, an external concentricity-measuring device, generally designated 18, and a perpendicularity-measuring device, generally designated 20. An expansible pilot arbor, generally designated 22, is mounted in a bore 24 in the sleeve portion 26 of the housing 14, which has a radial portion 28 integral with the top of the sleeve portion 26 and a marginal flange or rim portion 30 extending upwardly therefrom. The holder 12 is in the form of an elongated plate having arcuate end or handle portions 32 with hand holds 34 adjacent thereto.

The holder 12 has a central bore or hole 36 through which the lower portions of the measuring devices 16, 18 and 20 project. Adjacent the central hole 36, the holder 12 is drilled at circumferentially-spaced locations to receive screws 38 threaded into threaded holes 40 in the bottom of the sleeve portion 26 by which the holder 12 is secured to the housing 14. The holder 12 is also drilled and threaded at four locations disposed at the corners of a rectangle and receiving the upper threaded ends of four posts or legs 42. The posts 42 are of equal length and are sufficiently high to serve to rest upon a horizontal surface, such as a work bench or table, with the working parts of the three measuring devices 16, 18 and 20 raised above the lower ends 44 of the posts 42.

The sleeve portion 26 outwardly of the central bore 24 is provided with three circumferentially-spaced outlying bores 44 (FIGURE 4), 46 and 48 (FIGURE 3), preferably arranged at equally-spaced intervals such as 120 degrees apart. Mounted in the upper end portion of the bore 44 (FIGURE 4) is the stem portion 50 of an internal concentricity dial indicator 52 having the usual spring-pressed operating plunger 54 actuating the usual needle 53 relatively to its graduated dial 55. The operating plunger 54 engages the upper end of a motion-transmitting rod 56 reciprocably mounted in a bore 58 coaxial with the bore 44 and located in a bushing 60 snugly fitting the bore 44. The sleeve portion 26 of the housing 14 is drilled and threaded to receive upper and lower set screws 62 and 64 respectively engaging and clamping the dial indicator stem 50 and bushing 60 in the upper and lower portions of the bore 44.

The lower end of the bushing 60 (FIGURE 4) is provided with a diametral slot 65 drilled transversely to receive a pivot pin 66 upon which is rockably mounted the internal concentricity measuring feeler 68. The latter consists of an upper or base portion 70, the upper end of which is provided with a sharp-edged notched portion 72, the sharp edges of which engage the conical lower end 74 of the motion-transmitting rod 56. Projecting downwardly from the base 70 of the feeler 68 is a feeler pin 76 having a ball or spherical end 78.

The ball end 78 engages the counterbore 80 in the end of a workpiece W having a reference bore 82 adjacent the bore 80 and coaxial therewith. The workpiece W may consist, for example, of an automobile rear axle housing having a tubular outer end portion 84, and an annular flange 88 with an annular face 86, the perpendicularity of which is to be measured relatively to the axis of the bore 82. Located between the end portion 88 of the workpiece W containing the bore 80, the concentricity of which is to be measured relatively to the reference bore 82, and the flange 84 is an annular step 90 having an annular outer surface 92, the concentricity of which is to be measured relatively to the reference bore 82. The workpiece or axle housing W has a tubular main portion 94 only a small part of which is shown.

Mounted in the second outlying bore 46 (FIGURE 3) of the sleeve portion 26 of the housing 14 is the stem 96 of a second or outer concentricity-measuring dial indicator 98 of the external concentricity-measuring device 18, having the usual needle 100 registering with its graduated dial 102. The dial indicator 98 is also conventional and has the usual operating plunger 104 connected to the needle 100 through conventional motion-transmitting mechanism (not shown). The rounded lower end of the dial indicator plunger 104 engages the rounded upper end of a motion-transmitting rod 106 reciprocably mounted in a central bore 108 in an elongated bushing 110 snugly mounted in the third bore 48. The sleeve portion 26 of the housing 14 is drilled and threaded to receive upper and lower set screws 112 and 114 respectively clamping the dial indicator stem 96 and sleeve 110 in the upper and lower ends respectively of the second bore 46.

Near its conical lower end 116, the motion-transmitting rod 106 is provided with a transverse notch, slot or flattened portion 118. Engaging the upper and lower sides of the slot 118 is the end portion 120 of a bent retraction lever 122 which passes through a keyhole slot 124 (FIGURE 2) in the lower end of the bushing 100 and immediately beyond a bend 126 is pivotally mounted on a pivot pin 128 supported in a slotted post 130 secured to and depending from the lower side of the holder 12. The opposite end portion 132 of the retraction lever 122 is pivotally mounted on a pivot pin 134 in the slotted lower end portion of a retraction push button 136 (FIGURE 5) which is reciprocably mounted in a vertical bore 138 and urged upward by a compression coil spring 140 disposed between the holder 12 and the enlarged head 142 of the retraction push button 136.

The motion-transmitting rod 106 (FIGURE 3) is urged downwardly in its bore 108 by the same spring (not shown) contained within the dial indicator 18 which urges the dial indicator operating plunger 104 downward. This action urges the conical tip 116 of the motion-transmitting rod 106 into engagement with a sharp-edged notch 144 in the upper end of the base 146 of an external concentricity-measuring feeler 148. The latter is pivotally mounted on a pivot pin 150 which is mounted in the oppositely-drilled sides of a slot 152 in the lower end of the bushing 110. The feeler 146 has a bent or L-shaped lower contact portion 154 having a contact tip 156 adapted to engage the annular outer surface 92 of the annular stop 90. The tip 156 is normally urged away from the annular surface 92 by a leaf spring 158, the upper end of which is secured as by the fastener 160 to the flattened side portion 162 on the side of the bushing 110 when the motion-transmitting rod 106 is retracted by depressing the retraction push-button 136. This action prevents damage to the feeler 148 while the gauge 10 is being applied to the work.

Mounted in the third outlying bore 48 (FIGURE 3) of the sleeve portion 26 of the housing 14 is the stem 164 of a third or perpendicularity-measuring dial indicator 166 constituting the indicating portion of the perpendicularity-measuring device 20. The dial indicator 166 is also conventional and likewise has the usual operating plunger 168 connected to an indicating needle 170 through conventional motion-transmitting mechanism (not shown). The needle 170 likewise registers with a graduated dial 172 which indicates departure from perpendicularity of the annular radial surface 86. The rounded lower end of the dial indicator plunger 168 engages the rounded upper end of a motion-transmitting rod 174 reciprocably mounted in a central bore 176 in an elongated bushing 178 snugly mounted in the third bore 48. The sleeve portion 26 of the housing 14 is also drilled and threaded to receive upper and lower set screws 180 and 182 respectively clamping the dial indicator stem 164 and sleeve 178 in the upper and lower ends respectively of the third bore 48.

The sleeve 178 near its upper end is drilled chordally of the bore 176 to receive the opposite ends of a rotation-preventing pin 184 which registers with a flat-bottomed recess 186 in the side of the motion-transmitting rod 174. The motion-transmitting rod 174 also serves as a feeler and for that purpose is provided with a rounded lower end or tip 188 adapted to engage the radial surface 86, the perpendicularity of which is to be measured relatively to the axis of the reference bore 82 in the workpiece W. The bushing 178 is provided with a reduced diameter portion 190 to provide clearance for the tubular workpiece end portion 84, the outer or upper end 192 of which rests against three contact buttons 194, the shanks of which are seated in the lower end 196 of the sleeve portion 26 at circumferentially-spaced locations, specifically 120 degrees apart. The heads of the buttons 194 are preferably of a very hard wear-resisting material, such as hardened tool steel, tungsten carbide or the like.

The expansible pilot arbor (FIGURES 3 and 4) is interposed between the gauge 10 and the workpiece W to mutually align these two units. The expansible arbor 22 is conventional and is available on the open market and well-known to those skilled in the mechanical measuring art. For the purpose of the present invention, the arbor 22 shown consists of a head 200 mounted on the lower end of a stem 202 and seated in a shallow counterbore 203 of the bore 24. The head 200 carries an annular expansible pilot portion 204 which is expanded by hydraulic means (not shown) within the head 200 by means of a rotary operating shaft 206 to which is secured a T-shaped handle 208 by a pin 210. The mid-portion of the operating shaft 206 passes through a threaded reduced-diameter portion 212 of the stem 202 into the head 200 within which it is connected to the hydraulic expansion mechanism for expanding and contracting the annular pilot portion 204 into and out of tight engagement with the reference bore 82 within the tubular upper portion 83 of the workpiece W. An adapter bushing 214 is mounted in the bore 24 and in turn is provided with a bore 216 which snugly receives the stem 202. A nut 218 threaded upon the reduced diameter portion 212 of the stem 202 retains a fixed spring abutment washer 220 for the upper end of a helical compression spring 222, the lower end of which engages and urges downwardly a washer 224 against the upper end of the adapter bushing 214.

For the purpose of selectively locking the stem 202 of the expansible pilot arbor 22 against rotation, the stem 202 is provided on one side with a flat-bottomed recess 226 which is adapted to be engaged by the flattened end 228 of the reduced diameter portion 230 which projects inwardly from the enlarged-diameter main portion 232 of a manually-operable plunger or push pin 234 having a handle or knob 236 on the outer end thereof. The reduced diameter portion 230 of the plunger 234 projects through bores 238 and 240 in the adapter bushing 214 and sleeve portion 226 respectively into the recess 226. The main portion 232 of the locking plunger 234 is reciprocable within a counterbore 242 which opens into the bore 240, the space between them receiving a helical compression spring 244 which urges the plunger 234 outwardly so as to normally withdraw the flattened end 228 of the plunger 234 from engagement with the flat-bottomed recess 226 which prevents rotation of the stem 202 relatively to the sleeve portion 26 of the housing 14. The main portion 232 of the plunger 234 is provided with a flat-bottomed recess 246 which is engaged by a plate 248 having a straight lower edge 250 engaging the bottom of the recess 246 to prevent rotation of the plunger 234 relatively to the sleeve portion 26 of the housing 14. The sleeve portion 26 is drilled and threaded and the plate 240 drilled to receive screws 252 which hold the plate 240 in position within a recess 254 in the side of the sleeve portion 26.

In the operation of the multiple concentricity and perpendicularity gauge 10, let it be assumed that the workpieces W are supported in any suitable fixture (not shown) which presents their tubular end portions 84 most conveniently to the inspector for application of the gauge 10, such as in a vertical or upwardly-inclined position of the tubular end portions 84. With the workpiece W thus held rigidly, the operator grasps the rounded end portions 32 of the holder 12 in his two hands with his fingers extending through the hand holes 34. He then lowers the gauge 10 upon the workpiece W while depressing the retraction push button 136 with one thumb. This action rocks the bent lever 122 to retract the motion-transmitting rod 106 upward in its bore 108 (FIGURE 3), thereby freeing the conical lower end 116 from engagement with the sharp edges of the notch 144, and permitting the leaf spring 158 to swing the base portion 146 of the external concentricity feeler 148 clockwise around its pivot pin 150 so as to withdraw its contact tip 156 out of the possible path of collision with the step 90.

Having lowered the head 200 of the expansible arbor 22 into the tubular end portion 84 until the buttons 194 come to rest against the upper end 192 thereof, the operator expands the annular portion 204 thereof by turning the handle 208 on the upper end of the rotary operating shaft 206. This action expands the annular pilot portion 204 into tight engagement with the reference bore 82. Having released the retraction push button 136, the operator now rotates the holder 12 by means of the handle portion 32, simultaneously causing the internal concentricity feeler tip 78 to trace out an annular path within the bore 80 while the external concentricity feeler tip 156 traces out a similar path on the annular external surface 92 of the step 90, the rounded tip 188 of the motion-transmitting rod 174 meanwhile tracing out an annular path against the radial surface 86 on the flange 88. These actions, occurring simultaneously, cause the needles 100, 53 and 107 of the dial indicators 52, 98 and 166 respectively to swing back and forth relatively to their respective graduated dials 102, 55 and 172 if any deviation occurs from concentricity of the surfaces 80 and 92 relatively to the reference bore 82 or deviation from perpendicularity of the radial surface 86 relatively to the axis of the bore 82.

What I claim is:

1. A gauge for simultaneously measuring concentricity and perpendicularity of annular internal and external surfaces of a workpiece relatively to a reference bore thereof, said gauge comprising
   a housing structure having an annular pilot portion and having first, second and third bearing bores disposed with their axes in laterally-spaced parallel relationship with one another and with said pilot portion,
   first, second and third motion-transmitting members longitudinally reciprocably mounted in said first, second and third bearing bores respectively,
   means for coaxially aligning said pilot portion with the reference bore,
   first, second and third dial indicators mounted on said housing structure and having operating plungers extending into operated engagement with said motion-transmitting members,
   an internal surface concentricity feeler movably mounted on said housing structure in operative engagement with said first motion-transmitting member for motion transversely thereof into contacting engagement with the internal workpiece surface,
   an external surface concentricity feeler movably mounted on said housing structure in operative engagement with said second motion-transmitting member for motion transversely inward thereof into contacting engagement with the external annular workpiece surface,
   means interconnecting said first and second feelers with said first and second motion-transmitting members for converting the transverse motion of said feelers into longitudinal motion of said motion-transmitting members,
   and a perpendicular surface-contacting feeler portion on said third motion-transmitting member engageable with said external perpendicular surface.

2. A concentricity and perpendicularity gauge, according to claim 1, wherein means is provided for selectively moving said external surface concentricity feeler out of a path of engagement with said workpiece.

3. A concentricity and perpendicularity gauge, according to claim 2, wherein said means includes mechanism selectively operable for retracting said first motion-transmitting member and a resilient element normally urging said external surface concentricity feeler out of a path of engagement with said workpiece.

4. A concentricity and perpendicularity gauge, according to claim 3, wherein said retracting means includes a hand lever pivotally mounted on said housing structure and retractingly engaging said first motion-transmitting member.

5. A concentricity and perpendicularity gauge, according to claim 4, wherein said retracting means also includes a pushbutton reciprocably mounted in said housing structure and operatively engageable with said hand lever.

6. A concentricity and perpendicularity gauge, according to claim 2, wherein said external surface concentricity feeler has an approximately L-shaped tip contactingly engageable with the external annular workpiece surface.

7. A concentricity and perpendicularity gauge, according to claim 1, wherein said internal surface concentricity feeler is pivotally mounted on said housing structure with an internal annular surface-contacting tip disposed approximately coaxial with its respective motion-transmitting member, said tip having a surface-contacting portion projecting laterally therefrom.

8. A concentricity and perpendicularity gauge, according to claim 7, wherein said surface-contacting portion comprises an at least partially spherical protuberance.

9. A concentricity and perpendicularity gauge, according to claim 1, wherein said housing structure is provided with first, second and third bushing-receiving bores coaxial with said bearing bores, and wherein bearing bushings containing said bearing bores are mounted in said bushing-receiving bores.

10. A concentricity and perpendicularity gauge, according to claim 9, wherein said external and internal concentricity feelers are pivotally mounted on said bearing bushings.

11. A concentricity and perpendicularity gauge, according to claim 1, wherein said annular pilot portion comprises a centrally-disposed bore in said housing structure and wherein said bearing bores are disposed in circumferentially-spaced relationship around said central bore.

12. A concentricity and perpendicularity gauge, according to claim 9, wherein said annular pilot portion comprises a centrally-disposed bore in said housing structure, and wherein said bushing-receiving bores are disposed in circumferentially-spaced relationship around said central bore.

13. A concentricity and perpendicularity gauge, according to claim 1, wherein said annular pilot portion comprises a pilot bore in spaced parallel relationship with said bearing bores and wherein said aligning means comprises a pilot arbor mounted in said pilot bore.

14. A concentricity and perpendicularity gauge, according to claim 13, wherein said pilot arbor has an expansible annular head thereon engageable with the reference workpiece bore.

References Cited by the Examiner

UNITED STATES PATENTS

| | | | |
|---|---|---|---|
| 2,030,237 | 2/1936 | Brittain et al. | 33—174 |
| 2,403,898 | 7/1946 | Allen et al. | 33—174 |
| 2,657,468 | 11/1953 | Lyons | 33—174 |
| 2,692,439 | 10/1954 | Welson | 33—174 |
| 2,739,389 | 3/1956 | Carter | 33—174 |
| 3,040,436 | 6/1962 | Eisele | 33—174 |

ISAAC LISANN, *Primary Examiner.*